(12) United States Patent
Rafique et al.

(10) Patent No.: US 10,673,740 B2
(45) Date of Patent: Jun. 2, 2020

(54) SYSTEM AND METHOD FOR PROACTIVE TRAFFIC RESTORATION IN A NETWORK

(71) Applicant: ADVA Optical Networking SE, Meiningen ot Dreissigacker (DE)

(72) Inventors: Danish Rafique, Meiningen (DE); Joerg-Peter Elbers, Fuerstenfeldbruck (DE)

(73) Assignee: ADVA OPTICAL NETWORKING SE, Meiningen-Dreissigacker (DE)

( * ) Notice: Subject to any disclaimer, the term of this patent is extended or adjusted under 35 U.S.C. 154(b) by 0 days.

(21) Appl. No.: 16/112,295

(22) Filed: Aug. 24, 2018

(65) Prior Publication Data

US 2019/0068482 A1     Feb. 28, 2019

(30) Foreign Application Priority Data

Aug. 25, 2017   (EP) ..................... 17187977

(51) Int. Cl.
*H04L 12/721* (2013.01)
*H04L 12/24* (2006.01)
(Continued)

(52) U.S. Cl.
CPC .......... *H04L 45/123* (2013.01); *H04L 41/064* (2013.01); *H04L 41/0663* (2013.01);
(Continued)

(58) Field of Classification Search
CPC ... H04L 45/123; H04L 41/147; H04L 43/062; H04L 43/0817; H04L 45/124;
(Continued)

(56) References Cited

U.S. PATENT DOCUMENTS

| | | | |
|---|---|---|---|
| 6,275,990 B1 * | 8/2001 | Dapper | .................. G06F 17/14 725/106 |
| 8,009,985 B1 | 8/2011 | Roberts et al. | |

(Continued)

FOREIGN PATENT DOCUMENTS

| | | |
|---|---|---|
| EP | 2 375 637 A1 | 10/2011 |
| WO | WO 2013/005414 A1 | 1/2013 |
| WO | WO 2016/082859 A1 | 6/2016 |

OTHER PUBLICATIONS

Communication of the Extended European Search Report for European Patent Application Serial No. 17187977.8 dated (Feb. 9, 2018).

(Continued)

*Primary Examiner* — Duc C Ho
(74) *Attorney, Agent, or Firm* — Jenkins, Wilson, Taylor & Hunt, P.A.

(57) ABSTRACT

A system for proactive traffic restoration in a network includes at least one forecasting engine that models and forecasts traffic patterns of at least one traffic channel along a signal path of the network to provide forecast traffic quality metrics, y. The system further includes at least one time-to-failure, TTF, analyzer that calculates a time-to-failure, TTF, forecast for the traffic channel based on the forecast traffic quality metrics, y. The calculated time-to-failure, TTF, forecast is evaluated to trigger a proactive network traffic restoration.

16 Claims, 8 Drawing Sheets

(51) Int. Cl.
 *H04L 12/26* (2006.01)
 *H04L 12/729* (2013.01)
 *H04L 12/703* (2013.01)
 *H04L 12/803* (2013.01)
 *H04L 12/801* (2013.01)

(52) U.S. Cl.
 CPC .......... *H04L 41/142* (2013.01); *H04L 41/147* (2013.01); *H04L 43/062* (2013.01); *H04L 43/0817* (2013.01); *H04L 45/124* (2013.01); *H04L 45/125* (2013.01); *H04L 45/28* (2013.01); *H04L 47/125* (2013.01); *H04L 47/127* (2013.01); *H04L 41/5038* (2013.01); *H04L 43/0847* (2013.01)

(58) Field of Classification Search
 CPC ..... H04L 45/125; H04L 45/28; H04L 47/125; H04L 47/127; H04L 41/5038
 See application file for complete search history.

(56) References Cited

U.S. PATENT DOCUMENTS

| | | | |
|---|---|---|---|
| 8,995,249 | B1 | 3/2015 | Roy et al. |
| 9,258,190 | B2 | 2/2016 | Swinkels et al. |
| 2008/0250265 | A1 | 10/2008 | Chang et al. |
| 2011/0142446 | A1 | 6/2011 | Lyubomirsky |
| 2013/0045006 | A1 | 2/2013 | Dahan et al. |
| 2014/0056220 | A1* | 2/2014 | Poitau ............ H04W 76/14 370/328 |
| 2014/0341595 | A1 | 11/2014 | Harley et al. |
| 2015/0317197 | A1 | 11/2015 | Blair |
| 2015/0333824 | A1 | 11/2015 | Swinkels et al. |
| 2017/0366398 | A1 | 12/2017 | Mizrachi |
| 2019/0261071 | A1 | 8/2019 | Rafique et al. |

OTHER PUBLICATIONS

Extended European Search Report for European Patent Application Serial No. 18157843.6 dated (Aug. 1, 2018).
Commonly-assigned, co-pending U.S. Appl. No. 16/278,607 for "A Method and Apparatus for Optimizing Dynamically the Operation of an Optical Network," (Unpublished, filed Feb. 18, 2019).
Non-Final Office Action for U.S. Appl. No. 16/278,607 dated (Nov. 20, 2019).
Siracusa et al., "Proactive Restoration of Slow-Failures in Optical Networks," ICTON 2014, pp. 1-4 (2014).
Goncalves et al., "Applying Artificial Neural Networks for Fault Prediction in Optical Network Links," Telecommunications and Networking—ICT 2004, pp. 654-659 (2004).
Notice of Allowance and Fee(s) Due for U.S. Appl. No. 16/278,607 (dated Mar. 9, 2020).

* cited by examiner

Dashed: Fiber Connections
Solid: Control Traffic

SYSTEM AND METHOD FOR PROACTIVE TRAFFIC RESTORATION IN A NETWORK

PRIORITY CLAIM

This application claims the benefit of European Patent Application No. 17187977.8, filed Aug. 25, 2017, the disclosure of which is incorporated herein by reference in its entirety.

FIELD OF THE INVENTION

The invention relates to a system and method for proactive traffic restoration in a network, in particular in an optical network.

TECHNICAL BACKGROUND

Networks comprise network nodes connected to each other via links. In optical networks, signals are transported through optical fibers on one or more carriers at the same or different frequencies. The optical fibers form links between nodes of the optical network. A traffic channel can comprise one or more carriers transporting data from a source node of the optical network to a destination node of the optical network. Within the traffic channel, an optical signal is transported along a signal path from the source node to the destination node. A signal path can comprise a series of optical links. Networks are designed to serve pre-defined throughputs based on service level agreements SLAs. These service level agreements are ensured by traffic protection and restoration mechanisms in the network. A network can be planned based on designer knowledge and static engineering rules wherein margins are allocated for potential failure mechanisms. In conventional networks, in case of a failure, services are reactively switched over to either a dedicated protection path or one of shared restoration paths.

The conventional traffic restoration mechanism used in a network is prone to deficiencies. The conventional traffic restoration mechanism does not provide a sufficient real-time view on the current situation and does not provide proactive actions on traffic and link states. Due to the reactive restoration approach taken by conventional networks, service disruptions may occur. A further disadvantage of conventional traffic restoration mechanisms used in networks is that a progressive worsening condition of a working signal path in the network remains unaccounted for. In general, the reactive traffic restoration approach used in conventional networks leads to a pessimistic system or network design resulting in a worst-case operation to meet the service level agreements SLAs. Moreover, the conventional reactive traffic restoration approach provides very limited global optimization possibilities. Accordingly, there is a need to provide a method and system having a traffic restoration mechanism overcoming the above-mentioned disadvantages, in particular to provide a method and system having an efficient traffic restoration mechanism taking into account progressive worsening conditions of working signal and paths within the network.

SUMMARY OF THE INVENTION

The invention provides according to the first aspect a system for proactive traffic restoration in a network, said system comprising:
  at least one forecasting engine adapted to model and forecast traffic patterns of at least one traffic channel along a signal path of said optical network to provide forecast traffic quality metrics, y; said forecasting engine comprising:
    a time series pre-processing module configured to process received historical observations of traffic parameters of a monitored traffic channel affecting a performance of the traffic channel to provide time series patterns of said traffic channel, wherein the provided time series patterns include a trend, seasonality cycles and randomness of the raw data received by said time series pre-processing-module;
    an auto-correlation module configured to calculate an auto-correlation function, ACF, and a partial auto-correlation function, PACF, for the time series patterns of said traffic channel provided by said time series pre-processing module and
    a forecast model building module configured to compute the forecast traffic quality metrics, y, using a regression model based on the auto-correlation function, ACF, and the partial auto-correlation function, PACF, calculated by said auto-correlation module,
  said system further comprising:
    at least one time-to-failure, TTF, analyzer adapted to calculate a time-to-failure, TTF, forecast for the traffic channel based on the forecast traffic quality metrics, y provided by the forecasting engine, wherein the calculated time-to-failure, TTF, forecast is evaluated to trigger a proactive network traffic restoration.

An advantage of the system according to the first aspect of the present invention resides in the fact that the network traffic restoration can take place before a failure actually occurs. Consequently, service disruptions are avoided. Conventional systems are in general based on threshold-based operating points for link failure prediction (for instance if link L2 fails then link L1 will fail etc.). In contrast, the system according to the first aspect of the present invention follows a model-driven approach being not constrained to predefined rules. Whereas a conventional system namely triggers a prevention when a certain failure has already occurred (reactive approach) the system according to the first aspect of the present invention does proactively forecast failures and does take appropriate restoration actions. In some conventional systems packets might be partially propagated to a back-up path together with a working route whereas the system according to the present invention can cater a physical layer traffic split. In contrast to conventional systems which operate mainly on periodic update of historical threshold settings, the system according to the present invention operates based on raw data. The system according to the present invention follows a model-driven forecasting framework which may be scalable for years for both restoration and new service configuration. In particular, the system according to the present invention can model traffic and forecasts in real time, considering instantaneous network states. Whereas a conventional system may only cater slow changes in quality metrics, the system according to the present invention does allow to cater for any rate of metric evolution due to intrinsic forecasting information. Conventional systems are mostly used to perform a restoration of a network. In contrast, the system according to the present invention does address both network recovery (i.e. restoration and protection) but also new service configuration. A conventional system is normally only able to enable restoration when a certain threshold is met. In contrast the system according to the present invention allows restoration well within the failure limit. Whereas a conventional system is restricted to restoration based on backup path restoration time, the system according to the present invention does not only allow for restoration based on signal quality but can also determine path quality for a global optimization. A conventional system requires typically indexing and maintenance of backup path restoration times to enable an error prediction. In contrast, the system according to the present invention bases its forecast entirely on data using real time model identification. A conventional system may be constrained to a unique quality metric such as bit error rate, BER. The system according to the present invention does not have such limitations and allows both use of uni-variate and multi-variate metrics such as bit error rate, BER, OSNR, power, attenuation, etc.

In a possible embodiment of the system according to the first aspect of the present invention, the forecasting engine comprises a time series pre-processing module configured to process observations of traffic parameters of a monitored traffic channel affecting a performance of the traffic channel to isolate time series patterns of said traffic channel.

In a further possible embodiment of the system according to the first aspect of the present invention, the forecasting engine comprises an auto-correlation module configured to calculate an auto-correlation function and a partial auto-correlation function for the isolated time series patterns of said traffic channel provided by the time series pre-processing module.

In a still further possible embodiment of the system according to the first aspect of the present invention, the forecasting engine comprises a forecast model building module configured to compute the forecast traffic quality metrics using a regression model based on the auto-correlation function and the partial auto-correlation function calculated by the auto-correlation module of the forecasting engine.

In a still further possible embodiment of the system according to the first aspect of the present invention, the time-to-failure analyzer is adapted to calculate a path TTF forecast of said traffic channel along the signal path which connects network nodes via links. Multiple signal TTF can be aggregated in a linear or nonlinear manner to give a path TTF.

In a still further possible embodiment of the system according to the first aspect of the present invention, the time-to-failure analyzer is further adapted to calculate a link TTFs forecasts of the traffic channel for some or all links of the respective signal path.

In a still further possible embodiment of the system according to the first aspect of the present invention, the time-to-failure analyzer comprises a TTF exchange interface to share the calculated path TTF forecast and/or the calculated link TTF forecasts.

In a still further possible embodiment of the system according to the first aspect of the present invention, if a path TTF and/or a link TTF of a monitored traffic channel along a signal path within the network becomes critical, a proactive traffic restoration is initiated by a central controller of the system to take proactive actions against the critical path and/or critical links.

In a possible embodiment of the system according to the first aspect of the present invention, the proactive actions taken by the central controller of the system can include a partial or fully rerouting on a suitable signal path and/or a splitting of signals of the monitored traffic channel having a critical path TTF and/or a critical link TTF.

In a possible embodiment of the system according to the first aspect of the present invention, the regression model used by the forecast model building module of the forecasting engine comprises an auto-regressive integrated moving average, ARIMA, model, a moving average, MA, model or
a logistic regression model.

In a still further possible embodiment of the system according to the first aspect of the present invention, the calculated time-to-failure, TTF, forecast of a traffic channel is compared with an end of line, EOL, channel threshold to decide whether the time-to-failure, TTF, forecast is critical.

In a still further possible embodiment of the system according to the first aspect of the present invention, the forecasting engine is adapted to operate on one or more physical traffic parameters.

In a possible embodiment of the system according to the first aspect of the present invention, the physical traffic parameters used by the forecasting engine can comprise a bit error rate and/or a signal-to-noise ratio of a traffic channel.

In a still further possible embodiment of the system according to the first aspect of the present invention, a throughput of a monitored traffic channel and/or a throughput of other traffic channels is automatically adapted depending on the time-to-failure, TTF, forecast of the monitored traffic channel calculated by said time-to-failure, TTF, analyzer.

In a still further possible embodiment of the system according to the first aspect of the present invention, different paths within the network are sorted according to their calculated time-to-failure, TTF, forecasts which are output via an interface and/or used to select automatically a best-performing signal path within the network in response to a query.

In a still further possible embodiment of the system according to the first aspect of the present invention, the traffic channel can comprise one or more carriers, wherein a time-to-failure, TTF, forecast is calculated for each carrier by said time-to-failure, TTF, analyzer.

In a still further possible embodiment of the system according to the first aspect of the present invention, the network is an optical network comprising a plurality of network nodes connected to each other via links each having at least one optical fiber to transport optical traffic signals of traffic channels on one or more carriers.

The invention provides according to the second aspect a method for performing proactive traffic restoration in a network, the method comprising the steps of:

receiving historical observations of traffic parameters of a monitored traffic channel which are processed to provide time series patterns of said traffic channel along a signal path of said network, wherein the provided time series patterns include a trend, seasonality cycles and randomness of the received raw data;

evaluating the time series patterns of the traffic channel to compute forecast traffic quality metrics, y wherein an auto-correlation function, ACF, and a partial auto-correlation function, PACF, for the time series patterns of said traffic channel are calculated and a regression model based on the calculated auto-correlation function, ACF, and the calculated partial auto-correlation function, PACF, is used to compute the forecast traffic quality metrics, y, calculating a time-to-failure, TTF, forecast for the traffic channel based on the computed forecast traffic quality metrics, y; and initiating a proactive network restoration depending on the calculated time-to-failure, TTF, forecast of the traffic channel.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
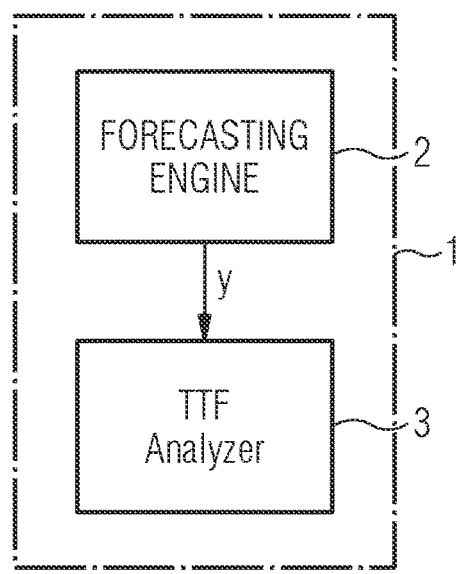
FIG. 1 shows a block diagram of a possible exemplary embodiment of a system for providing traffic restoration in a network according to the first aspect of the present invention.

As can be seen in the block diagram of FIG. 1, the system 1 for proactive traffic restoration in a network according to the first aspect of the present invention comprises in the illustrated embodiment two main components. The system 1 comprises at least one forecasting engine 2 adapted to model and forecast traffic patterns of at least one traffic channel along a signal path of the network to provide forecast traffic quality metrics y which are supplied to a time-to-failure, TTF, analyzer 3 of the system 1 as shown in FIG. 1. The time-to-failure, TTF, analyzer 3 is configured to calculate a time-to-failure, TTF, forecast for the traffic channel based on the received forecast traffic quality metrics y. The calculated time-to-failure, TTF, forecast is evaluated in a possible embodiment to trigger a proactive network traffic restoration.

The forecasting engine 2 comprises in a possible embodiment an interface to receive historical observations of traffic parameters of at least monitored traffic channel of the network. The network can comprise an optical network comprising several network nodes connected to each other via optical links. The optical links can comprise one or several optical fibers each adapted to transport optical signals of the traffic channels. A traffic channel can comprise in a possible embodiment one or more carriers for transporting data signals at different frequencies. The traffic channel can transport data from a source node of the network to a destination node of the network via a signal path. The signal path can include one or more links, in particular optical links. The TTF analyzer 3 of the system 1 can comprise one or several interfaces to output the calculated time-to-failure, TTF, forecasts of one or several traffic channels as well as control interfaces for interacting with the respective network. The forecasting engine 2 and the TTF analyzer 3 of the system 1 can be integrated in the same apparatus. This apparatus can be connected to the network. Alternatively the forecasting engine 2 and the TTF analyzer 3 can be located at different sites or network nodes and communicate with each other via a communication channel.

Figure 2:
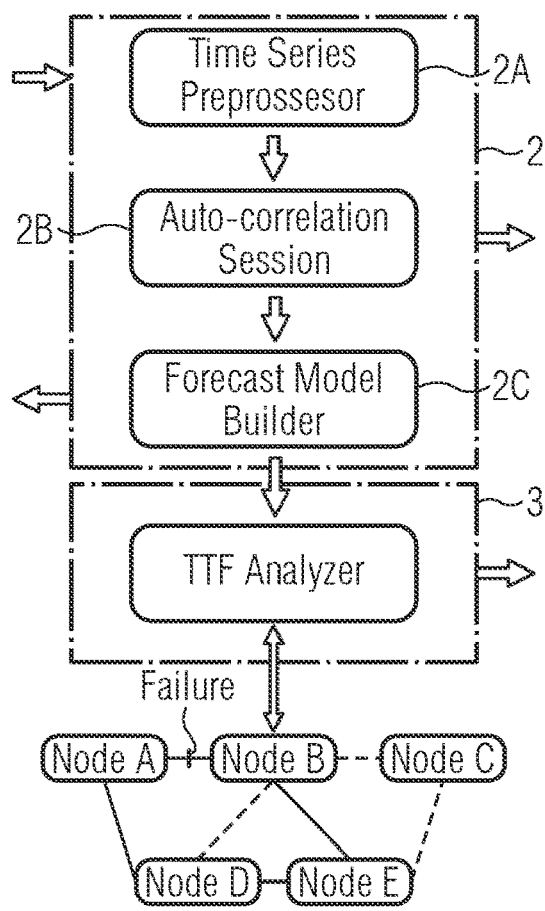
FIG. 2 shows a block diagram of a possible exemplary embodiment of the system according to the first aspect of the present invention.
Figure 3:
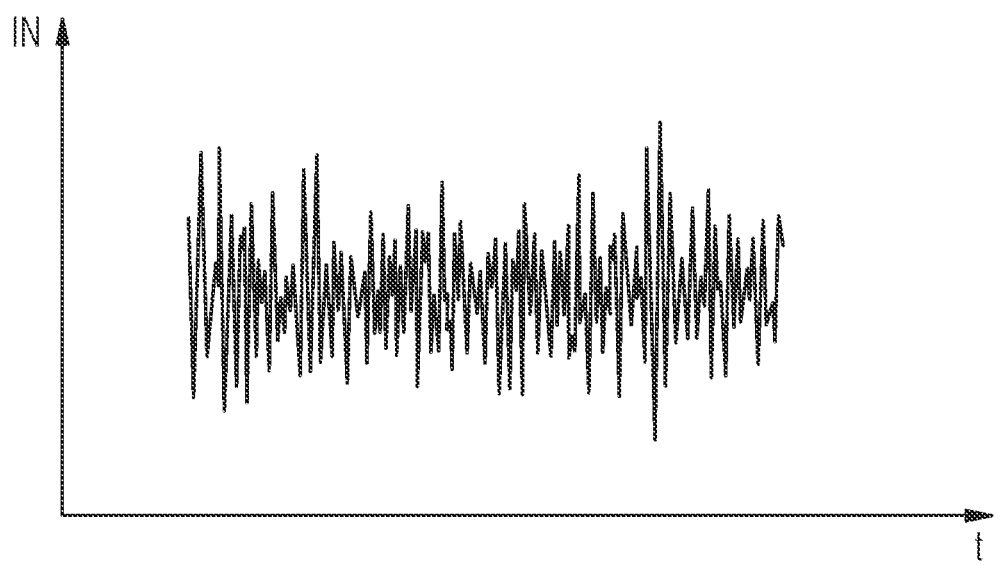
FIGS. 3, 4, 5 illustrate input signals, output signals and intermediate signals used by the system illustrated in FIG. 2 for proactive traffic restoration.
Figure 4:
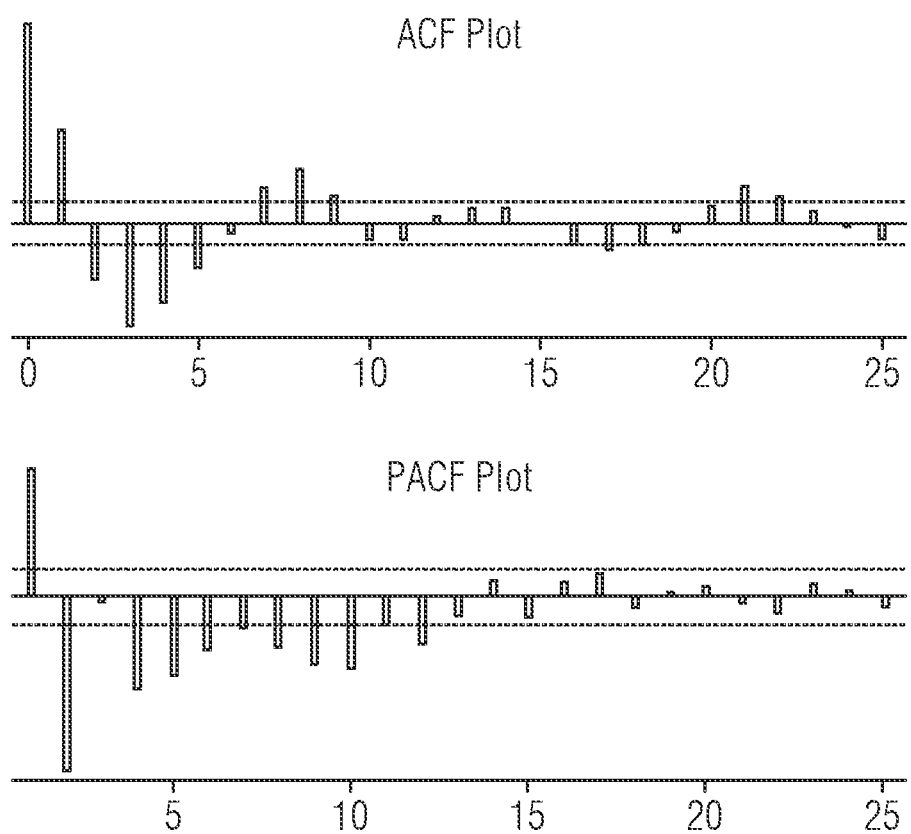

In a possible embodiment, the forecasting engine 2 of the system 1 can comprise different subcomponents or modules. As illustrated in the embodiment of FIG. 2, the forecasting engine 2 comprises a time series pre-processing module 2A, an auto-correlation module 2B and a forecast model building module 2C. The time series pre-processing module 2A is configured to process historical observations of traffic parameters of a monitored traffic channel as illustrated in FIG. 3 to isolate time series patterns of the monitored traffic channel. The auto-correlation module 2B is configured to calculate an auto-correlation function ACF and a partial auto-correlation function PACF for the isolated time series patterns of the traffic channel provided by the time series pre-processing module 2A. FIG. 4 shows an ACF plot and a PACF plot of the calculated auto-correlation function ACF and the partial auto-correlation function PACF.

Figure 5:
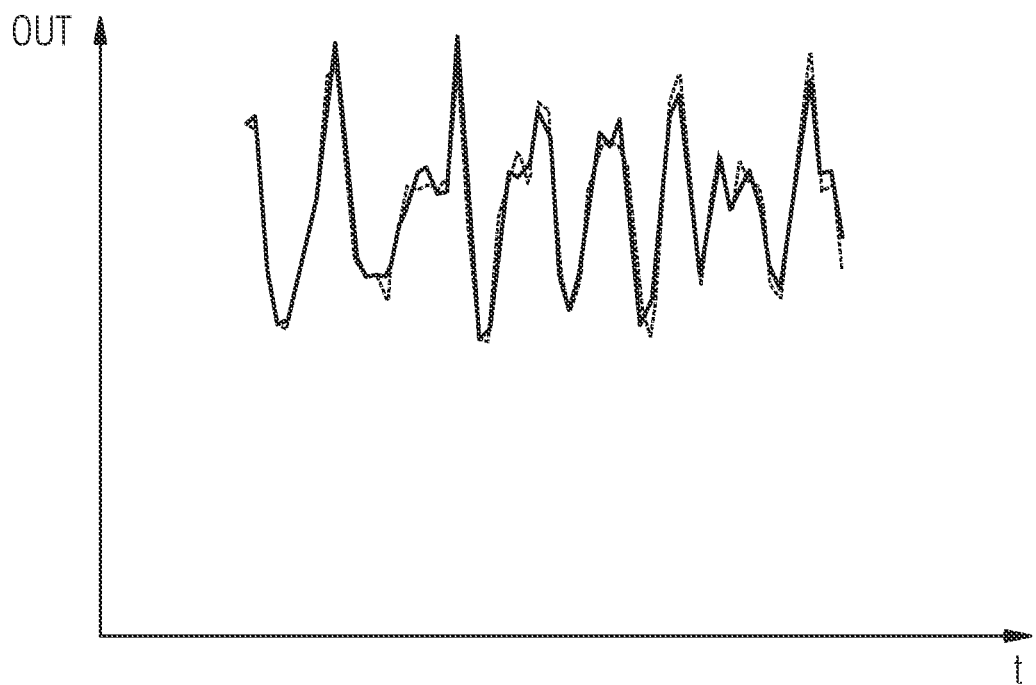
Figure 6:
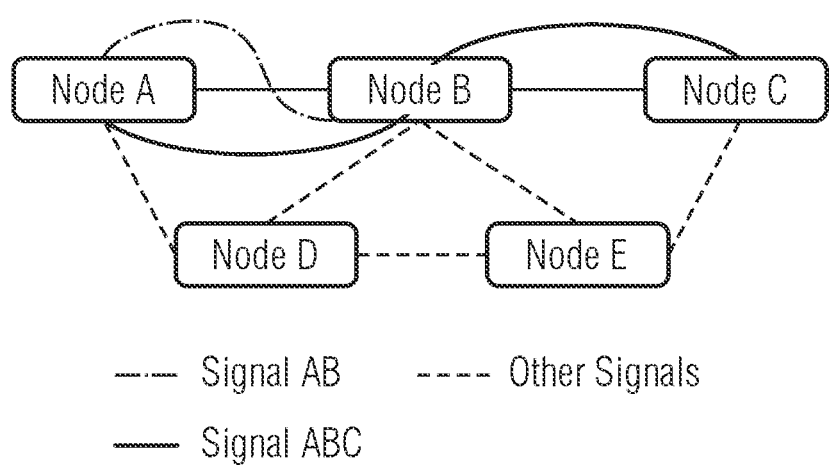
FIG. 6 illustrates an exemplary network in which a proactive traffic restoration can be performed by the system illustrated in FIG. 2.
Figure 9:
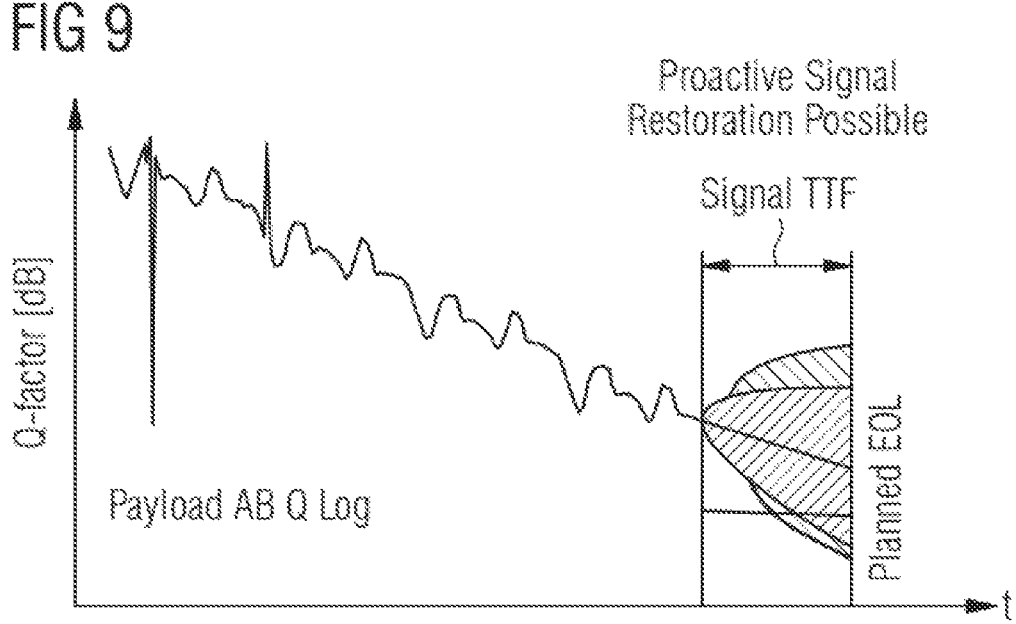
FIG. 9 illustrates the application of a forecast model by a TTF analyzer of the system according to the first aspect of the present invention for the quality factor illustrated in FIG. 8.

The forecast model building module 2C of the forecasting engine 2 is configured to compute forecast traffic quality metrics y using a regression model based on the auto-correlation function ACF and the partial auto-correlation function PACF calculated by the auto-correlation module 2B. Based on the forecast traffic quality metrics y the time-to-failure, TTF, analyzer 3 can calculate a time-to-failure, TTF, forecast for the monitored traffic channel from which the historical observations have been received by the time series pre-processor 2A. The calculated time-to-failure, TTF, forecast can be evaluated by the TTF analyzer 3 to trigger in a possible embodiment proactive network restorations of a network. An example of a possible exemplary network is illustrated in FIG. 6. Further, the TTF analyzer 3 can output actual and forecast TTF as also illustrated in FIG. 5. The regression model used by the forecast model building module 2C can be in a possible embodiment an autoregressive integrated moving average ARIMA model. In an alternative embodiment, the used regression model may comprise a moving average, MA, data model. In a still further alternative embodiment, the used regression model can comprise a logistic regression model. Any model can be used that allows to learn the historical signal. The TTF analyzer 3 can calculate one or several TTF forecast values. In a possible embodiment, the TTF analyzer 3 is adapted to calculate a path TTF forecast P-TTF for the traffic channel along the signal path which comprises several links connecting network nodes of the observed network. The TTF analyzer 3 can also be adapted to calculate each link of the signal path with an associated link TTF forecast L-TTF value. In a possible implementation, the TTF analyzer 3 can comprise a TTF exchange interface to share the calculated path TTF forecast and/or the calculated link TTF forecasts. In a possible embodiment, the calculated time to failure, TTF, forecast of a traffic channel can be compared with an end of life, EOL, channel threshold to decide whether the TTF forecast indicates a critical traffic channel as also illustrated in FIG. 9. In a possible embodiment, if a path TTF and/or a link TTF of a monitored traffic channel along a signal path within the network becomes critical, proactive traffic restoration can be initiated by a central controller of the system 1 to take proactive actions against the critical path and/or critical links. These proactive traffic restoration actions can include in a possible embodiment a partial or fully rerouting of the traffic channel on a suitable signal path with the network. In a possible embodiment, the proactive actions can also comprise a splitting of signals of the monitored traffic channel if it comprises a critical path TTF and/or at least one critical link TTF.

The forecasting engine 2 of the system 1 is adapted to operate on one or more physical traffic parameters of the traffic channel. These physical traffic parameters can for instance comprise a bit error rate BER and/or a signal-to-noise ratio SNR. In a possible embodiment, a throughput of a monitored traffic channel and/or other traffic channels within the network can be automatically adapted by the TTF analyzer 3 depending on the time-to-failure, TTF, forecast of the monitored traffic channel calculated by the TTF analyzer 3. In a possible embodiment, the TTF analyzer 3 can supply the calculated TTF forecast values to one or several control units of the network to perform the proactive restoration actions. In a possible embodiment, different paths within the network can be sorted according to their calculated TTF forecasts and output for instance in a list through a user interface of the system 1. Further, the TTFs can be used for performing an automatic selection of a best-performing path within the observed network in response to an input query.

FIG. 6 shows a possible exemplary network comprising several network nodes A, B, C, D, E connected to each other via links. FIG. 6 shows a typical example of a network failure scenario where traffic from node A to node E along a signal path ABE experiences a failure or disruption between network nodes A and B and is rerouted via node D (signal path ADE).

Figure 10:
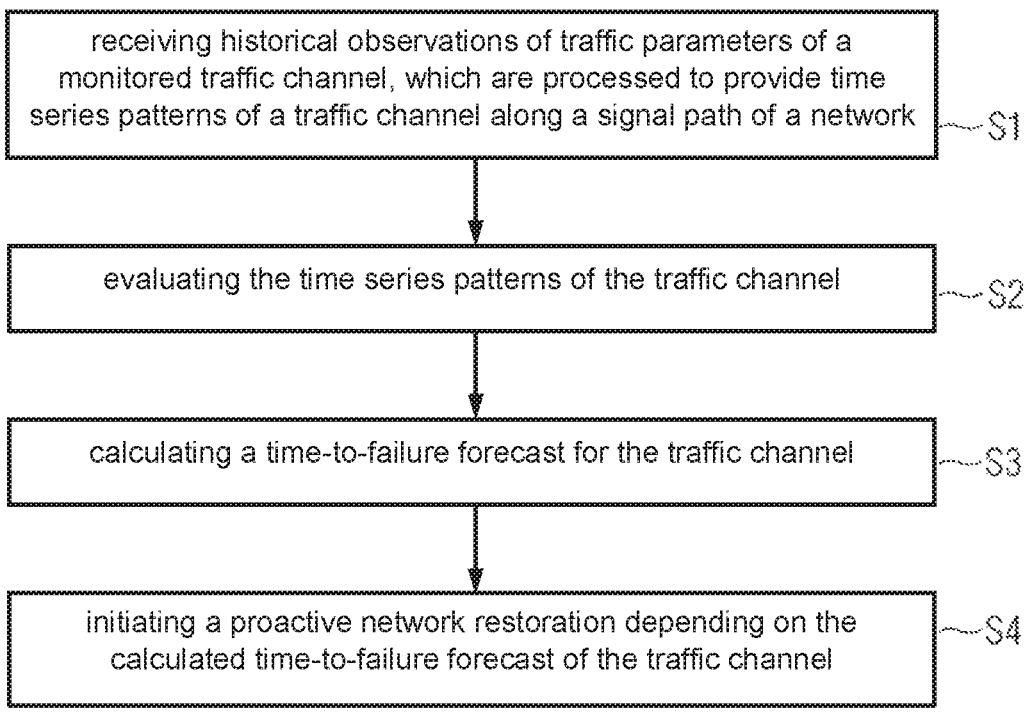
FIG. 10 shows a flowchart of a possible exemplary embodiment of a method according to the second aspect of the present invention.

As illustrated in the flowchart of FIG. 10, the method according to the second aspect of the present invention used for performing a proactive traffic restoration in a network, in particular an optical network, can comprise several main steps.

In a first step S1, an observation of traffic parameters of a traffic channel are processed to isolate time series patterns of the traffic channel along a signal path of the network as illustrated in FIG. 6.

In a further step S2, the time series patterns of the traffic channel are evaluated to compute forecast traffic quality metrics y.

In a further step S3, a time-to-failure, TTF, forecast for the traffic channel based on the forecast traffic quality metrics y is calculated.

Finally, proactive network restoration can be initiated depending on the calculated TTF forecasts of the traffic channel in step S4.

Figure 11:
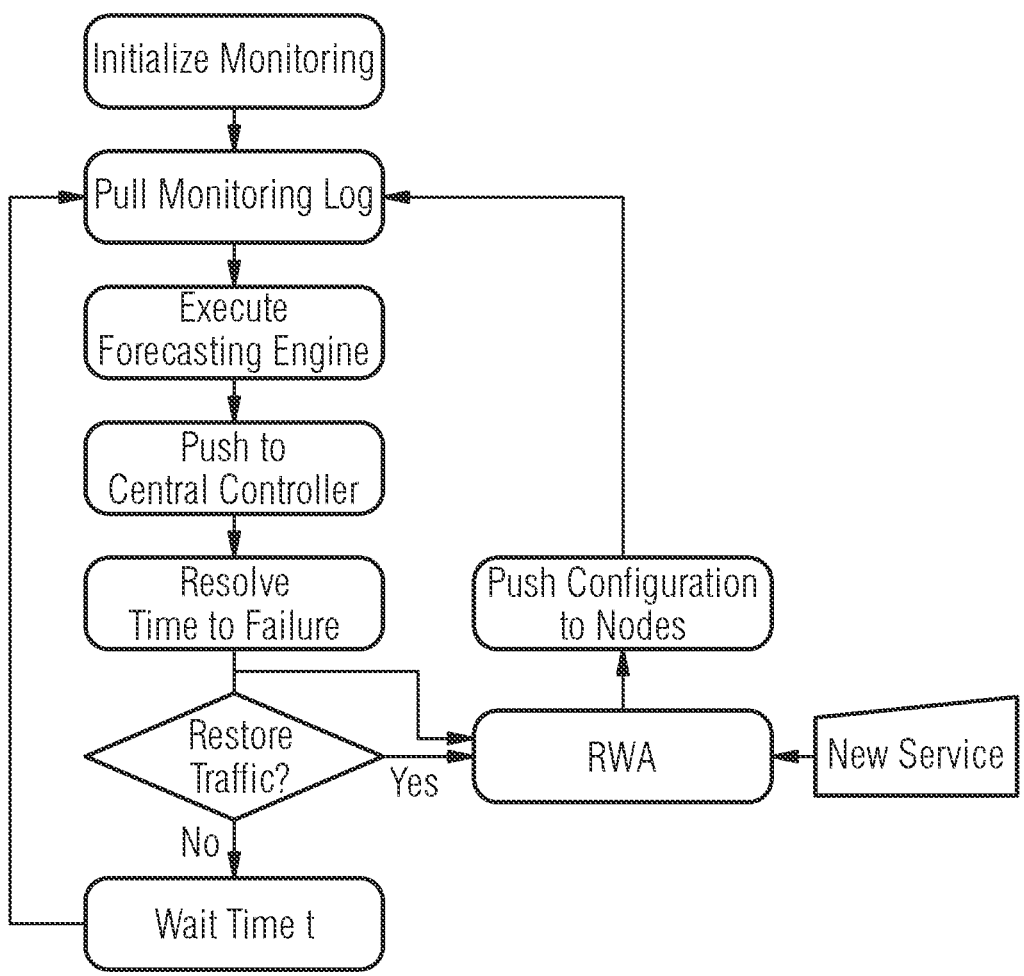
FIG. 11 shows a flowchart of a possible exemplary embodiment of the method according to the second aspect of the present invention.

In a possible embodiment of the method as illustrated in FIG. 11, network traffic is monitored and can be logged in real time, at fixed or variable time intervals, based on physical quality metrics y. These physical quality metrics y can be provided at the receiving side of the signal path. The network traffic, in particular the data traffic of a traffic channel can be logged and stored temporarily in a memory for further processing. The forecasting engine 2 of the system 1 is initiated to model and forecast traffic quality patterns and the TTF analyzer 3 is employed to determine time-to-failure, TTF, forecast values. The time-to-failure, TTF, forecast values of the signal path and/or links can be forecasted using individual or aggregated TTF indices. The results can be fed as an additional metric y to a routing computation algorithm executed by a routing controller. This can be formed by a centralized controller of the network. In a possible embodiment, the calculated time-to-failure, TTF, values can be shared by means of a TTF exchange interface of the TTF analyzer 3 to enable a proactive network restoration. In case of critical forecasted TTF values, a notification can take place and/or a proactive rerouting of the working signal path can be performed. This rerouting can be performed partially or completely. In a possible embodiment, a setup configuration and/or a service can use the calculated TTF indices, i.e. the path time-to-failure value P-TTFs and/or link time-to-failure values L-TTFs in real time to determine suitable working links and/or working paths. Likewise, the restoration framework may utilize the calculated link and path TTF indices for an optimum link and/or path identification as well. The steps of the method as illustrated in FIG. 10 can be repeated over the network lifetime of the network to proactively counteract service interruptions or disruptions within the network and to allow network operation in line with a service level agreement SLA.

The optical network may comprise a wavelength division multiplexed, WDM, optical network comprising optical channels. For example, the optical network may comprise two optical channels with a payload signal of 200 Gigabit per second each. The signal can comprise a modulation format of choice, e.g. DP-16 QAM. In the illustrated network of FIG. 6, a 200 G payload data traffic can be transported from node A to node B. In the network topology of FIG. 6, the signals traverse from node A to node B and from node A to node C, hereafter termed as AB and ABC.

Figure 7:
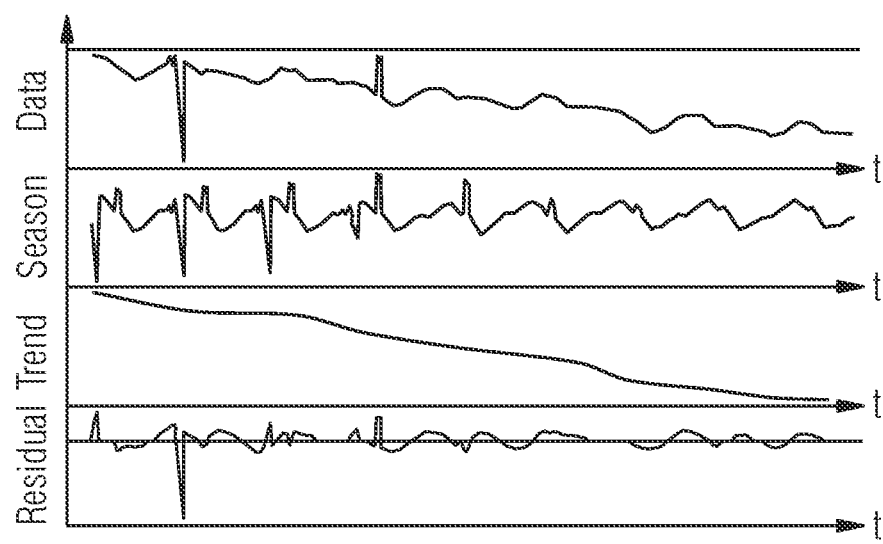
FIG. 7 illustrates the transformation of raw input data by the time series pre-processing module of the forecasting engine illustrated in FIG. 2 to isolate time series patterns.
Figure 8:
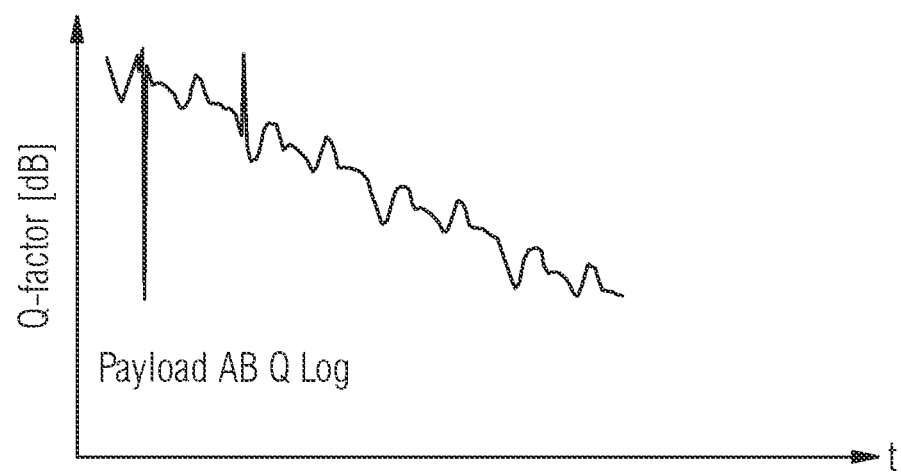
FIG. 8 shows a time diagram for illustrating an exemplary development of a quality factor of a traffic channel within a network which can be restored by the system according to the first aspect of the present invention.

Considering link AB between network nodes A, B, the signal quality can be monitored and logged in real time in a local memory of the apparatus 1 as illustrated in FIG. 2. The time series pre-processing module 2A can transform the received raw data to separate a trend and seasonality as illustrated in FIG. 7. The time series pre-processing module 2A processes the received historical observations as shown in FIG. 3 of traffic parameters being relevant for a performance of the respective traffic channel to isolate time series patterns of the traffic channel as shown in the example of FIG. 7. At the destination node, node B, the signal quality metrics y can be measured and stored, wherein a calculated quality factor Q per channel as one of the possible metrics is illustrated in FIG. 8. It can be seen in FIG. 8 that the quality factor Q starts degrading over time. This can be a consequence of multiple factors including e.g. a laser pump degradation, temperature dependent distortions, etc. The data illustrated in FIG. 8 corresponds to both current and historical quality factor log values of the signal on path AB between nodes A and B in the network illustrated in FIG. 6.

The auto-correlation module 2B calculates time series auto-correlations ACF and partial auto-correlations PACF as an input requirement for the forecasting model as also illustrated in FIG. 4. The identified lags—based on the dampening effect from ACF and PACF—are then fed to the forecast model building module 2C. In the forecast model building module 2C, model identification, parameter estimation and diagnostics are carried out using a regression data model. In a possible implementation, the used regression data model can comprise an ARIMA data model. In order to calculate a signal TTF in the TTF analyzer 3, the forecast model is applied and a forecast is made and evaluated in a possible implementation against an EOL channel set point as also illustrated in FIG. 9. The EOL threshold can be either pre-decided, input by a user during runtime, or may be based on a real-time data-driven analysis. The signal time-to-failure TTF is represented as the time to reach the threshold based on the forecast model as shown in FIG. 9. Likewise, a signal or path TTF for signal path ABC can be calculated. For example, the first signal path AB can comprise an identified signal time to failure TTF of ten years, whereas the second signal path ABC may have an identified signal TTF of seven years. The proactive actions are taken in the system 1 according to the present invention before the respective threshold is actually met.

The TTF information can be used to calculate a path TTF. In the exemplary scenario, the TTFs on a given signal path can be aggregated, e.g. via calculating an average, etc. This can be performed together with the calculation of a confidence interval for a respective path TTF of the signal path. In the given example, since there is only one signal TTF per signal path, this leads to signal path AB having a path TTF of ten years and a signal path ABC having a path TTF of seven years. Qualitatively, this can be translated to a path or channel quality Q based on a real time configuration at hand. This in fact not only captures the individual signal quality itself, but also the impact and contribution of other signals on the same signal path, and intrinsically includes the limitations from the effects of a number of traffic channels, power excursions or infrastructure type (SSMF, LEAF). In a possible embodiment, the calculated or determined signal TTF and path TTF can be centrally shared to enable a global network optimization across several network entities of the network. A critical worsening or non-optimal link TTF or path TTF can be used to proactively restore optical channels from the operational paths and may also be used as an additional input for optimal path computation algorithms or network restoration service operations.

FIG. 10 shows a flowchart of a possible exemplary embodiment of a method according to the present invention.

The signal TTF information can be used to identify a path quality Q of a signal path. Path quality parameters such as losses can also be directly monitored and evaluated using the framework illustrated in FIG. 2 resulting in directly measured path TTFs. The underlying signal paths may witness real-time degradation owing to worsening load, physical degradations including attenuation, polarization effects, bends and/or misalignments, etc. In a possible embodiment, for performing restoration, underlying traffic signals need not be rerouted but may also be split into one or more signal parts and transported through multiple working paths.

In a possible embodiment, the system 1 facilitates proactive network restoration thus ensuring network survivability and avoiding service disruption. Further, optimal link and/or path recommendations can be generated for routing computations of existing and additional services. At start-up, the forecasting engine 2 of the system 1 can be initialized to predict an initial traffic TTF of e.g. ten years. Based on global traffic TTF information, it may be concluded that the working signal path may have a time-to-failure, TTF, of e.g. 25 years. As the traffic quality starts to degrade over time—owing to multiple factors including deteriorating connectors, temperature-dependent distortions, etc.—the TTF traffic index of the working path can worsen or decrease as illustrated in the diagrams of FIGS. 8, 9. Likewise, the underlying path can also witness real-time TTF reductions owing to worsening load or physical degradations such as attenuation, polarization effects, bends, or misalignments. As soon as the TTF status becomes critical, the centralized controller of the network can instantaneously enforce protection or restoration path identification using a conventional network restoration technique.

Figure 12:
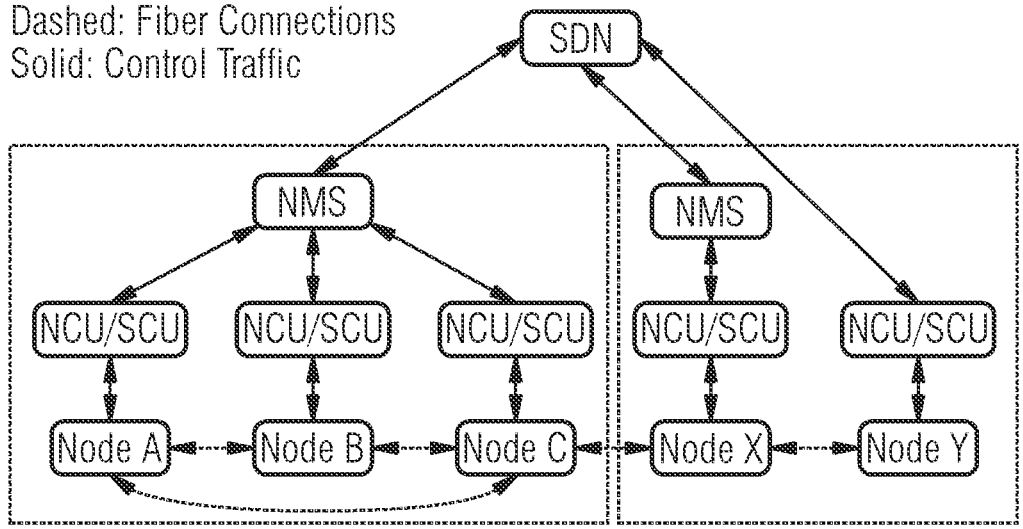
FIG. 12 shows a possible exemplary embodiment of a system according to the first aspect of the present invention.

FIG. 12 shows a possible exemplary embodiment of a network deploying a system for a proactive traffic restoration according to the present invention. The network itself is served by a central SDN (Software Defined Network) controller with underlying NMS (Network Management System) from different network segments. Further below, each NMS is fed by SCU/NCU (Shelf Control Unit/Network Control Unit) physically located at different node sites. It is also possible that the SCU or NCU can be directly connected to the centralized SDN controller. FIG. 12 illustrates fiber connections between network nodes in dashed lines. The solid lines of FIG. 12 illustrate control traffic connections.

Figure 13:
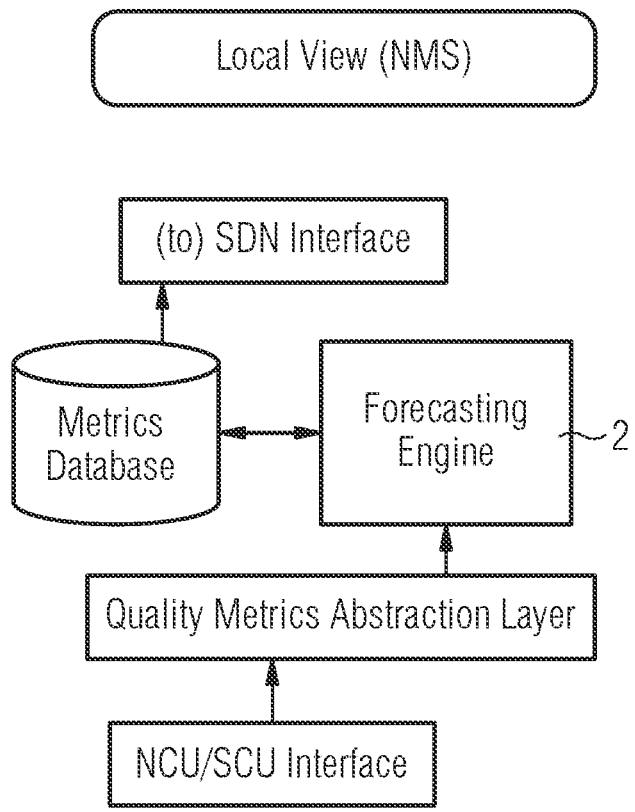
FIGS. 13, 14 show further possible exemplary implementations of a system according to the first aspect of the present invention.
Figure 14:
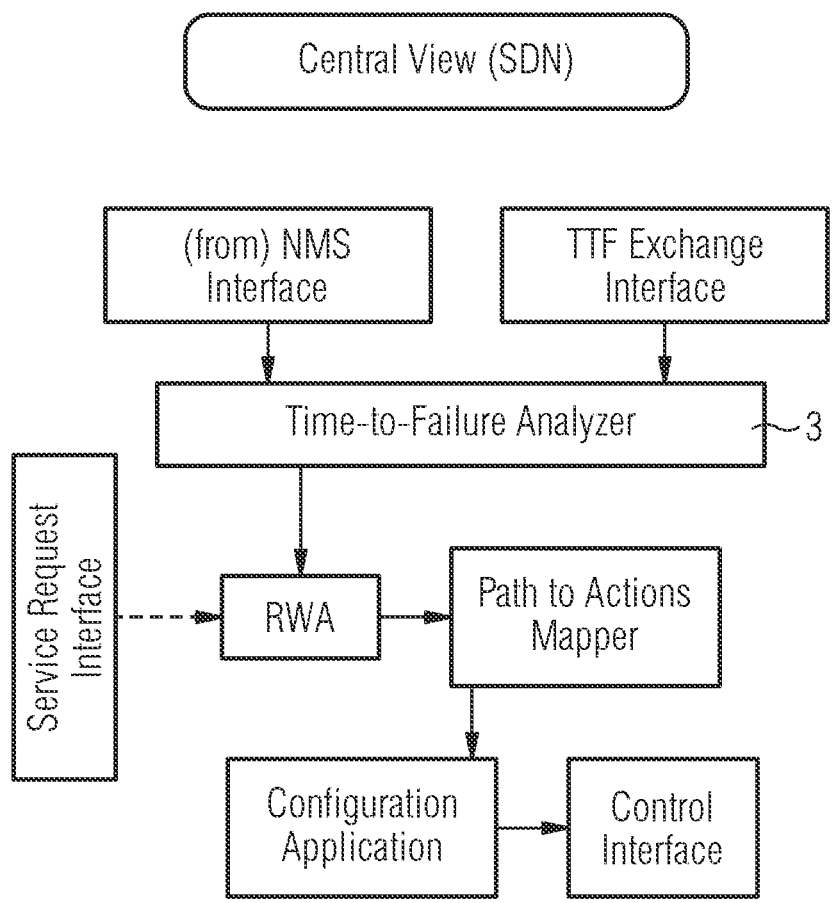

FIG. 13 shows a further possible exemplary implementation of a system for a proactive traffic restoration according to an aspect of the present invention. In the illustrated embodiment of FIG. 13, a forecasting engine 2 is located at the network management system NMS. Further, the TTF analyzer 3 is employed at a central SDN controller as shown in FIG. 14. At the local NMS, quality patterns are modelled, forecasted and stored in a metrics database as shown in FIG. 13. At the central SDN controller, forecasts from several forecasting engines 2 may be received via an NMS interface as illustrated in FIG. 14. Traffic and link or path time-to-failure, TTF, values are determined or calculated by the TTF analyzer 3 of the SDN controller. The traffic TTF may be used for proactive traffic restoration in case of a critical TTF index or TTF value. Further, the link and/or path TTF can be used in a possible embodiment as an additional metric for an RWA algorithm as also illustrated in FIG. 14. The triggered changes can be mapped in a possible embodiment to service configuration and shared with an entity under evaluation.

As illustrated in the embodiment of FIG. 2, the system 1 can comprise a forecasting engine 2 having a time series pre-processing module 2A, an auto-correlation regression module 2B and a forecast model building module 2C. The time series pre-processing module 2A may collect past observation of key physical, mechanical or environmental parameters which directly and/or indirectly affect the traffic and link performance. The time series pre-processing module 2A is configured to process historical observations of traffic parameters of a monitored channel affecting the performance of the traffic channel to isolate time series patterns of the traffic channel. The time series pre-processing module can isolate time series patterns such as trends, seasonality cycles or randomness as illustrated in the diagrams of FIG. 7.

The forecasting engine 2 further comprises an auto-correlation regression module 2B which is configured to calculated an auto-correlation function ACF and a partial auto-correlation function PACF. Auto-correlation and partial auto-correlation analysis can be employed to determine relationships amongst different time series observations.

For time series $\{a(t), t=0, 1, 2, \ldots\}$, the auto-covariance at lag n can be defined as:

$$x_n = \mathrm{Cov}(\alpha_t \alpha_{t+n}) = E[(\alpha_t - \mu)(\alpha_{t+n} - \mu)] \qquad (1)$$

The auto-correlation coefficient at lag n can be defined as:

$$p_n = x_n / x_0 \qquad (2)$$

wherein $\mu$ is the mean of the time series and $x_0$ is the covariance at lag zero. Similarly, it is possible to calculate a partial ACF (PACF) to measure a correlation between observation n period ago and a current observation.

In the forecast model building module 2C of the forecasting engine 2, a model identification and parameter estimation can be performed. Using the auto-correlation function ACF and the partial auto-correlation function PACF of the data, it is possible to identify the order of the used forecast model. Forecasts are calculated using a regression model that relates a time series variable to its path values. In a possible implementation, the parameters are estimated and a first order auto-regressive population model for $y_t$ is defined as follows:

$$y_t = \alpha_0 + \sum_{m=1}^{p} \alpha_m g\left(\beta_{0m} + \sum_{n=1}^{q} \beta_{nm} y_{t-1}\right) + \varepsilon_t \qquad (3)$$

with $g=1/(1+\exp(-x))$,
$\alpha_m$ (m=0, 1, 2 . . . p),
$\beta_m$ (n=0, 1, 2 . . . q, m=1, 2 . . . p) wherein
p is the number of auto-regressive terms,
q is the number of moving-average terms,
$\varepsilon_t$ is random errors (noise) which are assumed to be independently and identically distributed with a mean of zero and a constant variance and wherein
$y_t$ are the calculated forecast traffic quality metrics used by the TTF analyzer 3 to calculate a time-to-failure, TTF, forecast for the traffic channel.

In a possible embodiment, the TTF analyzer 3 can compute traffic TTFs and a list of top N critical paths together with its detailed link TTF views. The TTF analyzer 3 of the system 1 as shown in the embodiment of FIG. 2 can also be used to support a query for a preferable path and preferable links for a given destination node of the network. This kind of analysis is possible by determining individual traffic TTF and its deltas to determine preferable links. The TTF analyzer 3 can comprise a graphical user interface GUI to visualize the calculated forecasts for any given time interval to a user. In a possible embodiment, the TTF analyzer 3 can also communicate with a restoration framework to take proactive actions against critical links and paths. This restoration framework can e.g. comprise an RWA tool as illustrated in FIG. 14.

The forecasting model is used to predict traffic quality at a given instant, wherein the TTF analyzer 3 assigns a TTF index based on correlation of a projected forecast and an EOL threshold as also illustrated in FIG. 9.

The forecasting framework engine 2 allows to proactively perform a network traffic restoration. In a possible embodiment, the framework or system according to the present invention can comprise a transceiver forming part of a network node, a forecasting engine 2, a TTF analyzer 3, a local controller, a central controller and a mechanism to transmit and receive forecasts, time-to-failure, TTF, values as well as notifications for recommended counteractions for network traffic restoration. In a possible embodiment, the forecasting engine 2 can be employed at a NCU or NMS or SDN based on latency, optimization granularity or memory requirements of the system. In a possible embodiment, there can be more than one forecasting engine 2. The determined forecasts provided by the forecasting engines 2 are shared with the TTF analyzer 3 which can be implemented at a central controller of the network. The different forecasting engines 2 may operate in parallel. In a possible embodiment, a central controller of the network can globally share TTF values and configuration data with various network entities of the network. In a possible embodiment, the forecast TTF values can be determined based on a regular time interval or also at irregular time intervals. In a possible implementation, a minimum and maximum threshold value for the time-to-failure, TTF, determination can be configured. The forecasting engine 2 can operate on one or more physical parameters. The signal throughput of a traffic channel can be increased or decreased as an outcome of a change of its associated TTF index or TTF value calculated by the TTF analyzer 3. In a possible embodiment, a throughput of a traffic channel can be adapted through modulation size, symbol rate, time/frequency/space multiplexing, etc. depending on the TTF index or TTF value of the respective monitored traffic channel. In a possible embodiment, the traffic TTFs on a given path can be used to indicate best-performing paths. Further, the path TTFs can be used to find the best-performing paths in a given network. In a further possible embodiment, the path TTFs can be used as an additional metric for traffic reroute requests or new service provisioning. In a still further possible embodiment, the channel can comprise more than one TTF index in case of an optical or digital multi-carrier system. In a possible embodiment, the forecasting engine 2 and the TTF analyzer 3 can comprise hardware components and/or software components or a combination of hardware and software components. The traffic TTF can be determined in a possible embodiment based on individual or aggregated physical quality metrics. Link and path TTF values can be determined based on individual or aggregated physical quality metrics. In a possible embodiment, any network device's TTF may be determined based on individual or aggregated physical quality metrics of the respective device. In a still further possible embodiment, the TTF analyzer 3 can also be employed at the orchestrator or highest layer encompassing multiple networks, wherein an aggregation function of different TTF analyzers 3 may be performed for a global optimization of the whole system 1 including multiple networks. The TTF analyzer 3 can compute any kind of time-to-failures including a traffic time-to-failure T-TTF of a traffic channel, a path time-to-failure P-TTF of a signal path and a link time-to-failure L-TTF of a link forming part of a signal path. The calculated TTF indices including the traffic TTF indices, the path TTF indices and the link TTF indices can be used for proactive optical network restoration of the network. This allows for proactive traffic restoration as well as for global path optimization. The system 1 according to the present invention allows to identify network behavioral patterns in real time. Further, a full and partial throughput restoration can be performed based on the calculated TTF indices. The network path optimization can be performed based on real-time traffic quality information across the network. Further, a global network throughput optimization framework can be implemented based on the calculated TTF information received from a plurality of network devices within the network. The system 1 provides for a non-intrusive real-time restoration approach within any kind of networks, in particular optical networks, but also other kinds of networks such as an Ethernet network.

The time-to-failure, TTF, analyzer 3 of the system 1 as illustrated in the embodiments of FIGS. 1, 2 can calculate a signal TTF, a channel TTF representing real-time quality of a traffic channel forecasted into the future. Further, the TTF analyzer 3 can calculate a signal path TTF representing a real-time quality of a signal path which may be derived from one or more signal TTF values. A path represents a path going from a source node to a destination node comprising one or several links, wherein a signal or link TTF can be calculated for each link of the path.

The calculation of a path TTF for a signal path provides some key advantages. It allows for a real-time update of path quality information based on a live network configuration. A path TTF is an indicator on top of a usual RWA procedure. For example, signal AB and ABC both give path TTFs. When a new wavelength is added on AB or ABC or on both or PMD is increased, the calculated TTF does automatically reflect this change.

Further, the calculated path TTF consolidates all the underlying physical effects and metrics, e.g. reach, amplifier type, fiber type, etc., in one unit. For example, AB and ABC may have different amplification schemes with different power excursions, spectral locations, etc. The path TTF aggregates all the above information into a single unit for indicating possible failure.

The method and system 1 according to the present invention can not only be used for rerouting or for active network restoration but can also be used to exchange network equipment or to provide maintenance or repair of network equipment before it does fail.

The path TTF values can be calculated based on the intrinsic characteristics (not limited to signal TTF-based identification). For instance, the path TTFs can be calculated based on DSP read dispersion, PMD, etc., monitored network element power or OTDR-based link loss monitoring.

The signal TTF and the path TTF can be used as valuable information for setting up new services, e.g. when a new traffic signal needs to be inserted.

The entire system framework and method can operate in real-time.

The invention claimed is:

1. A system for proactive traffic restoration in an optical network, said system comprising:
   at least one forecasting engine adapted to model and forecast traffic patterns of at least one traffic channel along a signal path of said optical network to provide forecast traffic quality metrics, y; said forecasting engine comprising:
   a time series pre-processing module configured to process received historical observations of traffic parameters of a monitored traffic channel affecting a performance of the traffic channel to provide time series patterns of said traffic channel, wherein the provided time series patterns include a trend, seasonality cycles and randomness of raw data received by said time series pre-processing-module;
   an auto-correlation module configured to calculate an auto-correlation function, ACF, and a partial auto-correlation function, PACF, for the time series patterns of said traffic channel provided by said time series pre-processing module and
   a forecast model building module configured to compute the forecast traffic quality metrics, y, using a regression model based on the auto-correlation function, ACF, and the partial auto-correlation function, PACF, calculated by said auto-correlation module,
   said system further comprising:
   at least one time-to-failure, TTF, analyzer adapted to calculate a time-to-failure, TTF, forecast for the traffic channel based on the forecast traffic quality metrics, y provided by the forecasting engine, wherein the calculated time-to-failure, TTF, forecast is evaluated to trigger a proactive network traffic restoration.

2. The system according to claim 1, wherein the regression model used by the forecast model building module of the forecasting engine comprises an auto-regressive integrated moving average, ARIMA, model, a moving average, MA, model or
   a logistic regression model.

3. The system according to claim 2, wherein if a signal path TTF, P-TTF, forecast and/or a link TTF, L-TTF, forecast of a monitored traffic channel along a signal path within the optical network becomes critical, a proactive traffic restoration is initiated by the central controller of the system to take proactive actions against the critical signal path and/or critical links of said signal path including a partial or fully rerouting on best performing paths indicated by the calculated signal path TTF forecast and/or splitting of signals of the monitored traffic channel having a critical signal path TTF, P-TTF, and/or a critical link TTF, L-TTF.

4. The system according to claim 1,
   wherein said time-to-failure, TTF, analyzer is adapted to calculate a signal path TTF forecast, P-TTF, of said traffic channel along the signal path going from a source node to a destination node and which connects network nodes via links and/or link TTFs forecasts, L-TTF, of said traffic channel for links forming part of said signal path, wherein the signal path TTF forecast represents a real time quality of the respective signal path.

5. The system according to claim 1, wherein said time-to-failure, TTF, analyzer is implemented in a central controller and comprises a TTF exchange interface to share the calculated signal path TTF forecast, P-TTF, and the calculated link TTF forecasts, L-TTFs, with network entities of the optical network.

6. The system according to claim 1, wherein the forecast traffic quality metrics, y, comprise a quality factor Q.

7. The system according to claim 6, wherein the proactive restoration is triggered before the calculated quality factor Q degrading over time reaches a threshold.

8. The system according to claim 1, wherein the forecasting engine is adapted to operate on received historical observations of one or more physical traffic parameters of the monitored traffic channel comprising a bit error rate, BER, and/or a signal-to-noise ratio, SNR, to provide a time series patterns of the traffic channel.

9. The system according to claim 1, wherein a throughput of a monitored traffic channel and/or other traffic channels is automatically adapted depending on the time-to-failure, TTF, forecast of the monitored traffic channel calculated by said time-to-failure, TTF, analyzer.

10. The system according to claim 1, wherein different signal paths within the network are sorted according to their calculated TTF forecasts which are output via an interface and/or used to select automatically a best-performing path within the optical network in response to a query.

11. The system according to claim 1, wherein the traffic channel comprises one or more carriers, wherein a time-to-failure, TTF, forecast is calculated for each carrier by said time-to-failure, TTF, analyzer.

12. The system according to claim 1, wherein the optical network comprising a plurality of network nodes connected to each other via links each having at least one optical fiber to transport optical traffic signals of traffic channels on one or more carriers.

13. A method for performing proactive traffic restoration in an optical network,
   the method comprising the steps of:
   receiving historical observations of traffic parameters of a monitored traffic channel which are processed to provide time series patterns of said traffic channel along a signal path of said network, wherein the provided time series patterns include a trend, seasonality cycles and randomness of received raw data;

evaluating the time series patterns of the traffic channel to compute forecast traffic quality metrics, y wherein an auto-correlation function, ACF, and a partial auto-correlation function, PACF, for the time series patterns of said traffic channel are calculated and a regression model based on the calculated auto-correlation function, ACF, and the calculated partial auto-correlation function, PACF, is used to compute the forecast traffic quality metrics, y, calculating a time-to-failure, TTF, forecast for the traffic channel based on the computed forecast traffic quality metrics, y; and initiating a proactive network restoration depending on the calculated time-to-failure, TTF, forecast of the traffic channel.

14. The method according to claim 13, wherein the signal path forecast, P-TTF, of said traffic signal along the signal path going from a source node to a destination node and connecting network nodes via links and/or link TTFs forecasts, L-TTFs, of said traffic channel for links forming part of said signal path are calculated for the traffic channel based on the computed forecast traffic quality metrics, y.

15. The method according to claim 13, wherein the traffic channel comprises carriers, wherein a time-to-failure, TTF, forecast is calculated for each carrier based on the computed forecast traffic quality metrics, y.

16. The method according to claim 13, wherein the used regression model comprises an auto-regressive integrated moving average, ARIMA, model, a moving average, MA, model or a logistic regression model.

* * * * *